United States Patent [19]

Morikura et al.

[11] Patent Number: 5,539,846
[45] Date of Patent: Jul. 23, 1996

[54] SYSTEM AND METHOD FOR TRANSMITTING PARALLEL SIGNALS VIA AN OPTICAL TRANSMISSION PATH

[75] Inventors: Susumu Morikura, Yawata; Satoshi Furusawa; Hideaki Takechi, both of Osaka, all of Japan

[73] Assignee: Matsushita Electric Industrial Co., Ltd., Osaka, Japan

[21] Appl. No.: 410,313

[22] Filed: Mar. 24, 1995

[30]    Foreign Application Priority Data

Mar. 25, 1994  [JP]  Japan ..................................... 6-055539

[51] Int. Cl.⁶ ............................................................ G02B 6/28
[52] U.S. Cl. ................... 385/24; 359/110; 370/10
[58] Field of Search ........................... 385/24; 359/110, 359/118, 136, 165; 370/10, 13, 85.5

[56]    References Cited

U.S. PATENT DOCUMENTS

| | | | |
|---|---|---|---|
| 4,449,247 | 5/1984 | Waschka, Jr. ........................... | 359/110 |
| 4,451,916 | 5/1984 | Casper et al. ........................... | 359/110 |
| 4,456,793 | 6/1984 | Baker et al. ............................. | 359/110 |
| 4,501,000 | 2/1985 | Immink et al. ........................... | 375/25 |
| 4,768,202 | 8/1988 | Lacroix et al. ........................... | 359/110 |
| 4,807,222 | 2/1989 | Amitay .................................... | 359/136 |
| 4,866,704 | 9/1989 | Bergman ................................. | 359/137 |
| 5,050,164 | 9/1991 | Chao et al. .............................. | 359/135 |
| 5,136,587 | 8/1992 | Obana et al. ............................ | 370/112 |
| 5,185,736 | 2/1993 | Tyrrell .................................... | 359/136 |
| 5,189,671 | 2/1993 | Cheng .................................... | 359/118 |

FOREIGN PATENT DOCUMENTS

| | | |
|---|---|---|
| 0208558 | 1/1987 | European Pat. Off. . |
| 61-191140 | 8/1986 | Japan . |
| 61-273030 | 12/1986 | Japan . |

OTHER PUBLICATIONS

"Signal Defect Function", FC-PH-REV 4.3 Jun. 1, 1994.

*Primary Examiner*—Akm E. Ullah
*Attorney, Agent, or Firm*—Price, Gess & Ubell

[57]    ABSTRACT

A parallel signal transmission system for transmitting parallel signals from a transmission unit to a reception unit via an optical fiber, at a low cost without spoiling their quality. The transmission unit converts received parallel signals into serial signals frame by frame, by means of a frame sync signal, and further converts the serial signals into direct current equilibrium signals which are either CMI codes or DMI codes. At the same time, the direct current equilibrium signals are multiplexed with the frame sync signal in accordance with the code ruling violation in order to drive a laser diode having a 0.78 μm wavelength and output intensity-modulated optical signals to the optical transmission path. As the optical transmission path, a plastic clad fiber is used whose core diameter is 200 μm or larger in order to agree with the laser diode having a 0.78 μm wavelength. In the reception unit, the optical signals are photo/electric converted by means of a silicone photo diode, amplified into direct current equilibrium signals having a predetermined amplitude by means of an alternating current coupling type amplifier. The amplified direct current equilibrium signals are divided into serial signals and the frame sync signal by detecting a coding rule violation, and reproduced into original parallel signals by using the divided frame sync signal.

10 Claims, 7 Drawing Sheets

FIGURE 2
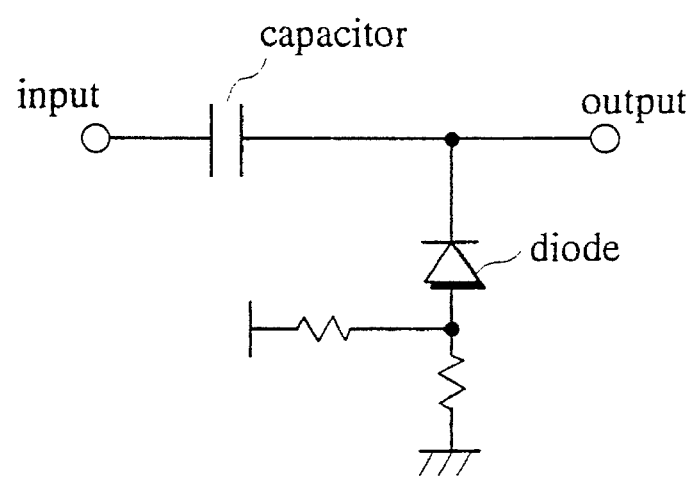
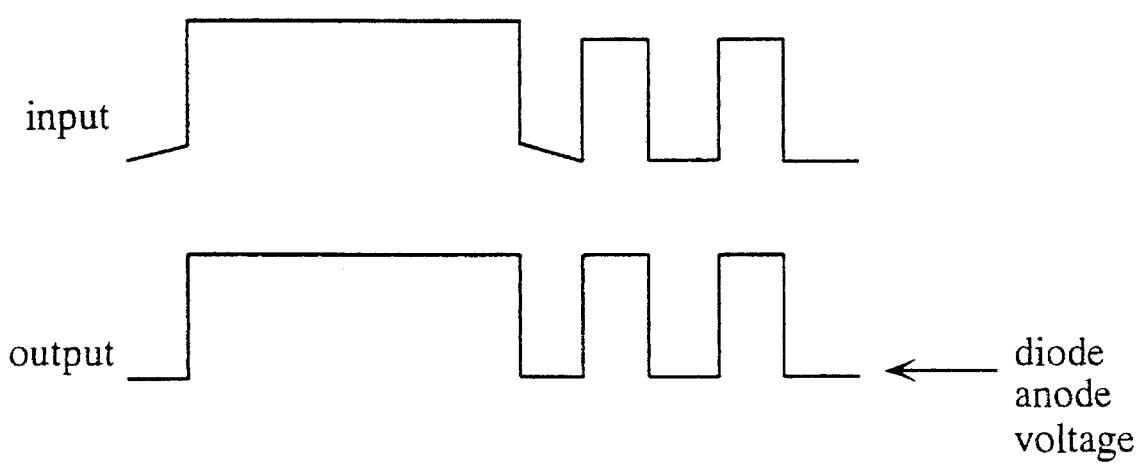

SYSTEM AND METHOD FOR TRANSMITTING PARALLEL SIGNALS VIA AN OPTICAL TRANSMISSION PATH

BACKGROUND OF THE INVENTION

1. Field of the Invention

The present invention relates to a system and method for transmitting and receiving parallel signals between devices interconnected in a computer or between computers at a relatively short distance, via an optical fiber.

2. Description of the Related Art

A well-known conventional parallel signal transmission system with an optical transmission path is Fiber Channel system which has been standardized by American National Standards Institute (hereinafter ANSI) (see ANSI X3T11 FC-PH REV4.3). According to the Fiber Channel system, 8-bit parallel signals inputted to the transmission unit of the system are sent to the reception unit as follows.

FIG. 1 is a block diagram showing the conventional parallel signal transmission system, which is composed of a transmission unit A, a transmission path B, and a reception unit C.

In the transmission unit A, 8-bit parallel signals inputted to the terminals 1–8 are first converted into 10-bit parallel signals in the 8B/10B conversion circuit 10, by adding 2 bits for synchronization. Then, the 10-bit parallel signals are converted into serial signals in the parallel/serial conversion circuit 11 for serial transmission.

Here, for the framing of the reception unit C, the frame sync signal generation circuit 50 outputs frame sync signals to the parallel/serial conversion circuit 11 in a certain time period immediately after the system has been powered on, based on a control signal inputted to the terminal 9. The frame sync signals are either 0011111010 or 1100000101 in the case of the Fiber Channel system.

Then, the parallel/serial conversion circuit 11 makes the drive circuit 12 drive a semi-conductor laser diode (hereinafter LD) 13 having a 0.78 μm wavelength to output intensity-modulated optical signals. Generally, the intensity of lights to be outputted is changed in proportion to the amount of the current to be supplied to LDs.

LDs use a light which is generated from the recombination of carriers by supplying current which amounts over the threshold in the forward direction of P-N connection. Having their own resonance structure, LDs can exhibit a light having high coherency. The oscillation mode of LDs can be either a vertical mode in which an electromagnetic field is formed in the direction for a light to expand, or a horizontal mode in which an electromagnetic field is formed in the direction vertical of the light expansion. Generally, the sizes of waveguides are fixed to allow LDs to oscillate based on the horizontal mode, in view of efficient light coupling with an optical circuit such as an optical fiber, the proportional relation between outputted lights and the current amount, modulation in a wide band width, low noise, and the like.

Out of LDs having a 0.78 μm wavelength and a 1.3 μm wavelength standardized by the ANSI, LDs having a 0.78 μm wavelength are popular for use in compact discs and easily available as a light emitting element. The LD 13 having a 0.78 μm wavelength emits a light in an approximate range of ±10 degrees in the horizontal direction and ±20 degrees in the vertical direction.

Then, in the transmission path B, optical signals outputted from the LD 13 are converged by the lens 14 and sent through the graded index fiber 15 (hereinafter GI 15) whose core diameter is either 50 or 62.5 μm. Since the GI 15 can receive a light in the range of ±11.5 degrees, the lens 14 is used in order to secure the coupling efficiency between the LD 13 and the GI 15.

Generally, optical fibers are superior to other transmission media in flexibility, lightness in weight, signal transmission stability to temperature, or the like. They are composed of a core having a large index of refraction and a clad having a smaller index of refraction which coats the core. Optical signals are sent through the core, repeating a total reflection on the border surface between the core and the clad.

Optical fibers are classified into single mode type (hereinafter SM type) fibers and multi mode type (hereinafter MM type) fibers, depending on their optical signal propagation modes. The SM type fibers have a small core diameter of about 10 μm so that only one propagation mode exists, and as a result, the wide transmission band width allows signals to be transmitted at a high speed of 500 Mbps or higher. However, the SM type fibers are hard to be connected because of their small core, so that they do not lead to cost reduction.

On the other hand, the MM type fibers are further classified into step index (hereinafter SI) type fibers and graded index (hereinafter GI) type fibers.

The SI type fibers have an about 1 mm core diameter, and their index of refraction changes in the form of stairs on the border of the core and the clad. This type of fibers are mainly used in the field of controlling the transmission of signals of 50 Mbps or smaller, for example factory automation.

The GI type fibers have a core diameter of about 50 μm, and their index of refraction is not uniform but gradually diminished toward the outermost surface of the core. This design makes optical signals be propagated windingly or spirally against the axis of the optical fibers. Thus, the MM type fibers can provide various propagation modes because of their large core diameter, and as a result, the transmission band width is relatively smaller than that of SM type fibers. Consequently, the GI type fibers having a wider transmission band are more commonly used than the SI type fibers, for the purpose of transferring signals of around 200–500 Mbps between devices in a computer or between computes at a relatively short distance.

Then, in the reception unit C, optical signals sent through the GI 15 are photo/electric converted with a light reception element 16, and further amplified in the amplification circuit 17 to obtain serial signals having a fixed amplitude. The serial signals are converted into 10 bit parallel signals in the serial/parallel conversion circuit 18.

In the frame sync signal detection circuit 51, when a frame sync signal having a predetermined pattern has been detected, it is regarded that a frame synchronization has been established, then every 10-bit serial signals which follow the detected frame sync signal are converted into parallel signals. Then, the parallel signals sent from the serial/parallel conversion circuit 18 are converted back into 8-bit parallel signals in the 10B/8B conversion circuit 19 and outputted through the terminals 21–28. A light reception element is selected depending on the wavelength of an optical signal coming into the element. Generally, a silicon pin photo diode is used together with the LD 13 having a 0.78 μm wavelength. The core diameter of the light reception element can be from 80 μm and 1 mm; however, the larger the core diameter is, the smaller the frequency band width of the light reception unit is. This makes high speed signal transmission difficult. This is the reason that a light reception element having a core diameter of around 100 μm is generally used with a GI type fiber having a core diameter of 50 μm. When an LD having a 0.78 μm wavelength is used, the angle of a light going out from the GI type fiber is around 1.1 degrees.

As described hereinbefore, according to the conventional parallel signal transmission system, 8B/10B codes are used as transmission signals to drive the LD 13 to output intensity-modulated optical signals. As a result, some 10-bit parallel signals may lengthen the duration of light emission of the LD 13, causing mode hopping noises, which are inherent to the LD 13.

To be more specific, the oscillating wavelength of LDs tends to be longer in accordance with the increase in the index of refraction when the temperature of the LDs or the amount of current to be supplied thereto are raised. This causes the vertical mode to hop, and as a result, oscillating wavelength hopping is generated, which is accompanied with noises. These noises are called mode hopping noises, which appear as irregular intensity of a laser beam.

In the case of 8B/10B codes, "1" values may be consecutive for at most 6 bits in accordance with the coding rule. Consequently, for example, in the case of signals having a bit rate of 192 Mbps, the transmission rate turns out to be 192×(10/8)=240 on the transmission path, and as a result, the duration of light emission of the LD 13 becomes (1/240M)×6 =25 ns. In the same manner, in the cases of signals having 300 Mbps, 400 Mbps, and 500 Mbps, the duration of the light emission of the LD 13 becomes 16 ns, 12 ns, and 9.6 ns, respectively. Thus, the longer the duration of the LD 13 is, the higher the possibility of the occurrence of the mode hopping noises is. The mode hopping noises are the first factor of the generation of burst bit errors in received signals.

When either 0 values or 1 values are consecutive, low frequency components increase, causing the fluctuation of DC components in the transmission path signals. The fluctuation of the DC components changes, for example, the operational bias potential of the amplification circuit 17 in the reception unit C, so that it gets harder to correctly demodulate signals. To restrict the fluctuation of the DC components, the reception unit C processes signals based on a DC voltage of its own regulation, without relying on received signals. This process is generally called DC reproduction, which is achieved by integrating a DC reproduction circuit composed of a clamping circuit into the amplification circuit 17.

FIG. 2 shows the construction of a specific DC reproduction circuit, and the waveforms of pulse signals to be inputted thereto and outputted therefrom, in order to explain the operation of the DC reproduction circuit. As apparent from FIG. 2, the low level of an inputted pulse signal is supposed to be clamped by the anode voltage of the LD 13. Thus, pulse signals to be outputted are supposed to be operated based on the anode voltage, regardless of the signs of the pulse signals.

However, the DC reproduction circuit is susceptible to the effects of low frequency noise, which mainly results from resistance, heat noise in diode and useless signals which come from other circuits. Because of the effects of the low frequency noise, the low level (or high level) of the pulse signals to be outputted from the DC reproduction circuit is not fixed but undesirably sways in the case of a low frequency. Consequently, the use of a DC reproduction circuit becomes the second factor of the occurrence of burst bit errors when the sign is identified in the next stage.

Since the GI 15 has a relatively small core diameter of from 50 to 62.5 μm, a small error in the size of the connecting portion of a connecter or a splice may have great effects, causing modal noises at high probability. For example, a 5 μm divergence of the light axis for a core diameter of 50 μm would affect about 10% of the core diameter.

The modal noises occur when a laser beam having excellent coherency is transmitted by means of a multi mode fiber, as a result of the difference in the optical transmission path lengths between the low mode and the high mode. To be more specific, the difference in light path lengths causes interference fringe, which changes as time goes by the vibration of the fiber or heat disturbance. If the entire amount of light is received, the light path lengths are averaged, causing no noise. However, if a part of the light is received because of the divergence of the light axis at the connecting portion of the fiber or the like, modal noises are generated. The modal noises become the third factor of the occurrence of burst bit errors.

As described hereinbefore, any of the mode hopping noises generated in LDs, low frequency noise generated in the reception unit, and the modal noises generated in an optical fiber may cause burst bit errors when signals are demodulated in the reception unit. It is hardly possible to avoid the occurrence of these noises by the conventional parallel signal transmission system. In order to secure a high quality signal transmission performance for a long period of time, it is necessary to provide a signal process circuit for performing a complicated process such as error correction, and also to use a precision light connector. However, this inevitably raises the cost.

SUMMARY OF THE INVENTION

The present invention has an object of providing a system and method for transmitting parallel signals between devices interconnected in a computer or between computers at a relatively short distance, via an optical fiber, at a low cost without spoiling their quality.

The above object can be achieved by the parallel signal transmission system constructed as follows, and by transmitting parallel signals as follows.

The transmission unit is composed of a parallel/serial conversion unit, an encoding unit, and an electric/photo conversion unit. At first, parallel signals received by the parallel/serial conversion unit are converted into serial signals frame by frame. Then the serial signals are converted into direct current equilibrium signals by the encoding unit. At the same time, the direct current equilibrium signals are multiplexed with the frame sync signal by using a coding rule violation. Furthermore, the direct current equilibrium signals multiplexed with the frame sync signal are converted into optical signals in the electric/photo conversion unit to output them to the optical transmission path.

The optical transmission path is made of an optical fiber and receives the optical signals outputted from the electric/photo conversion unit to transmit them to the reception unit.

The reception unit is composed of a photo/electric conversion unit, a decoding unit, and a serial/parallel conversion unit. The optical signals transmitted through the optical transmission path are converted into electric signals by the photo/electric conversion unit and amplified into direct current equilibrium signals having a certain amplitude. The direct current equilibrium signals are divided into serial signals and a frame sync signal by the decoding unit, and reproduced into the original parallel signals by means of the frame sync signal in the serial/parallel conversion unit.

The direct current equilibrium signals can be CMI codes or DMI codes. The electric/photo conversion unit drives a laser diode, which is a light emitting element, in accordance with the direct current equilibrium signals multiplexed with the frame sync signal, thereby converting the electric signals into intensity-modulated optical signals and outputting them. The laser diode may have a 0.78 μm wavelength.

As the optical fiber, which composes the optical transmission path, a plastic clad fiber having a core diameter of 200 μm or larger is used in order to receive the entire amount of light sent through the laser diode.

The photo/electric conversion unit uses a silicone photo diode as a light reception element whose diameter is larger than that of the plastic clad fiber. As the amplifying element, an alternating current coupling type amplifier is used.

The use of the parallel signal transmission system having the above-explained construction can avoid mode hopping noises to be generated in LDs, modal noises to be generated in optical fibers, and low frequency noises to be generated in the reception unit. Consequently, the cause of the occurrence of burst bit errors can be eliminated, requiring no circuit to correct complicated errors. Furthermore, parallels signals can be transmitted without the use of a precision optical connector for a long period of time, without spoiling their quality and at a low cost.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows illustrations to explain the operation of the DC reproduction circuit.

DESCRIPTION OF THE PREFERRED EMBODIMENT

Figure 1:
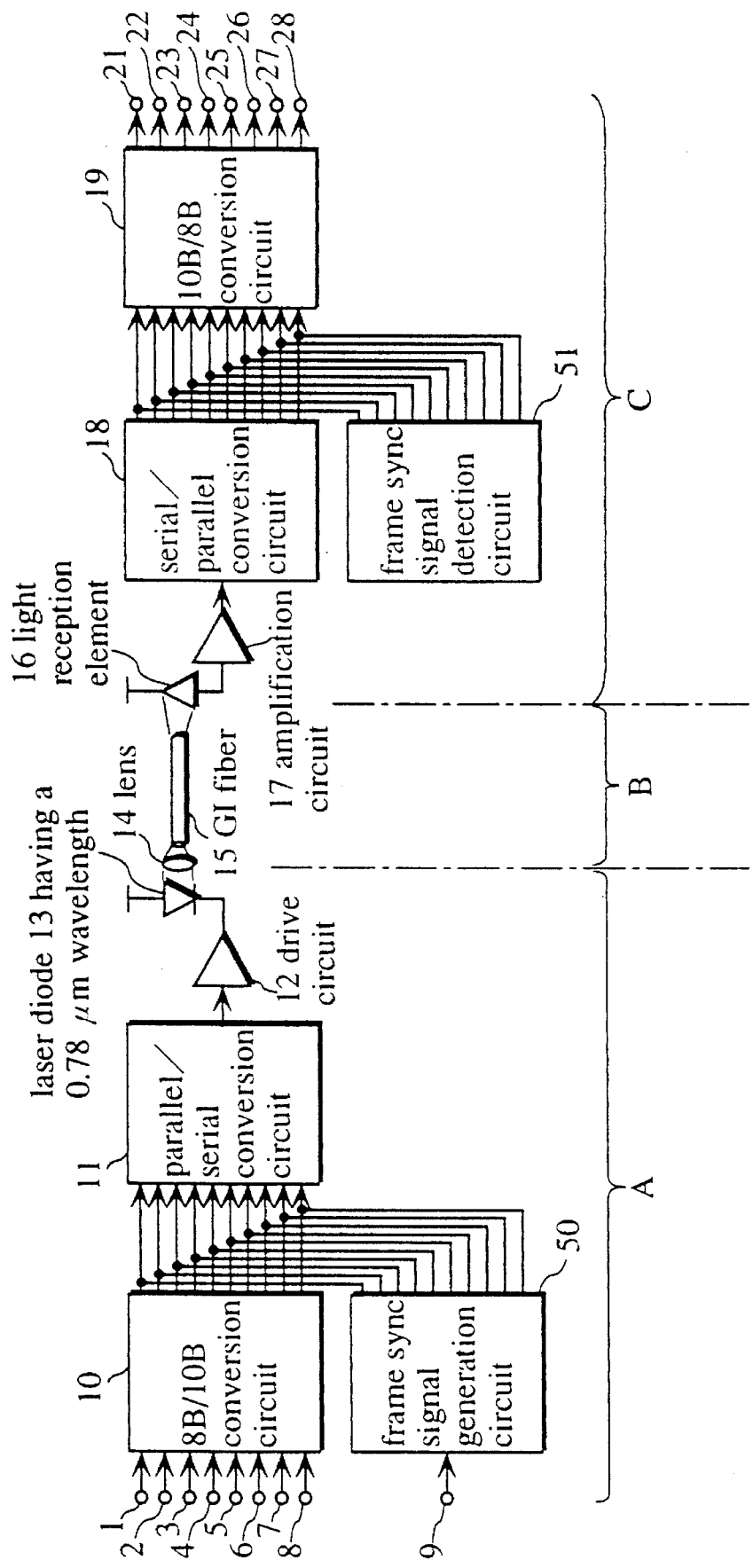
FIG. 1 is a block diagram showing the conventional parallel signal transmission system.
Figure 3:
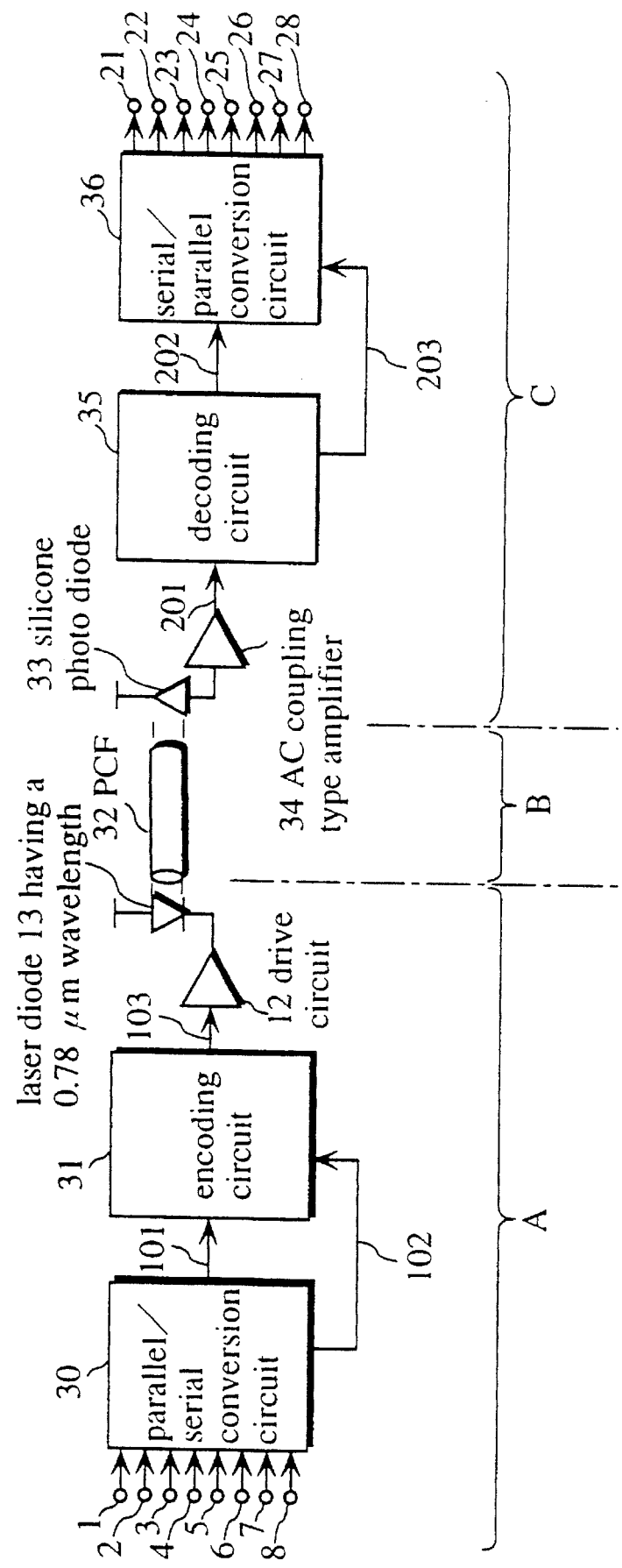
FIG. 3 is a block diagram showing the construction of a parallel signal transmission system of the embodiment of the present invention.

An embodiment of the present invention will be described with reference to the attached drawings. FIG. 3 is a block diagram showing the construction of a parallel signal transmission system of the present embodiment, which is composed of a transmission unit A, a transmission path B, and a reception unit C in the same manner as the conventional system shown in FIG. 1.

First of all, in the transmission unit A, 8-bit parallel signals inputted through the terminals 1–8 are converted into serial signals 101 in the parallel/serial conversion circuit 30, which is composed of a shift register. The parallel/serial conversion is performed frame by fragile, which consists of 8 bits. Then, the obtained serial signals 101 are converted into DC equilibrium signals 103 in the encoding circuit 31, the DC equilibrium signals 103 being 1B/2B codes.

The DC equilibrium signals 103 are used not to spoil bit sequence independency (hereinafter BSI) by restricting the DC components and the occurrence of the sequence of 0 values to fit to the low-pass operating characteristic of the transmission path. The BSI indicates that every information string to be impressed on the transmission path can be properly transmitted. The DC equilibrium signals 103 can be CMI codes or DMI codes.

Figure 5:
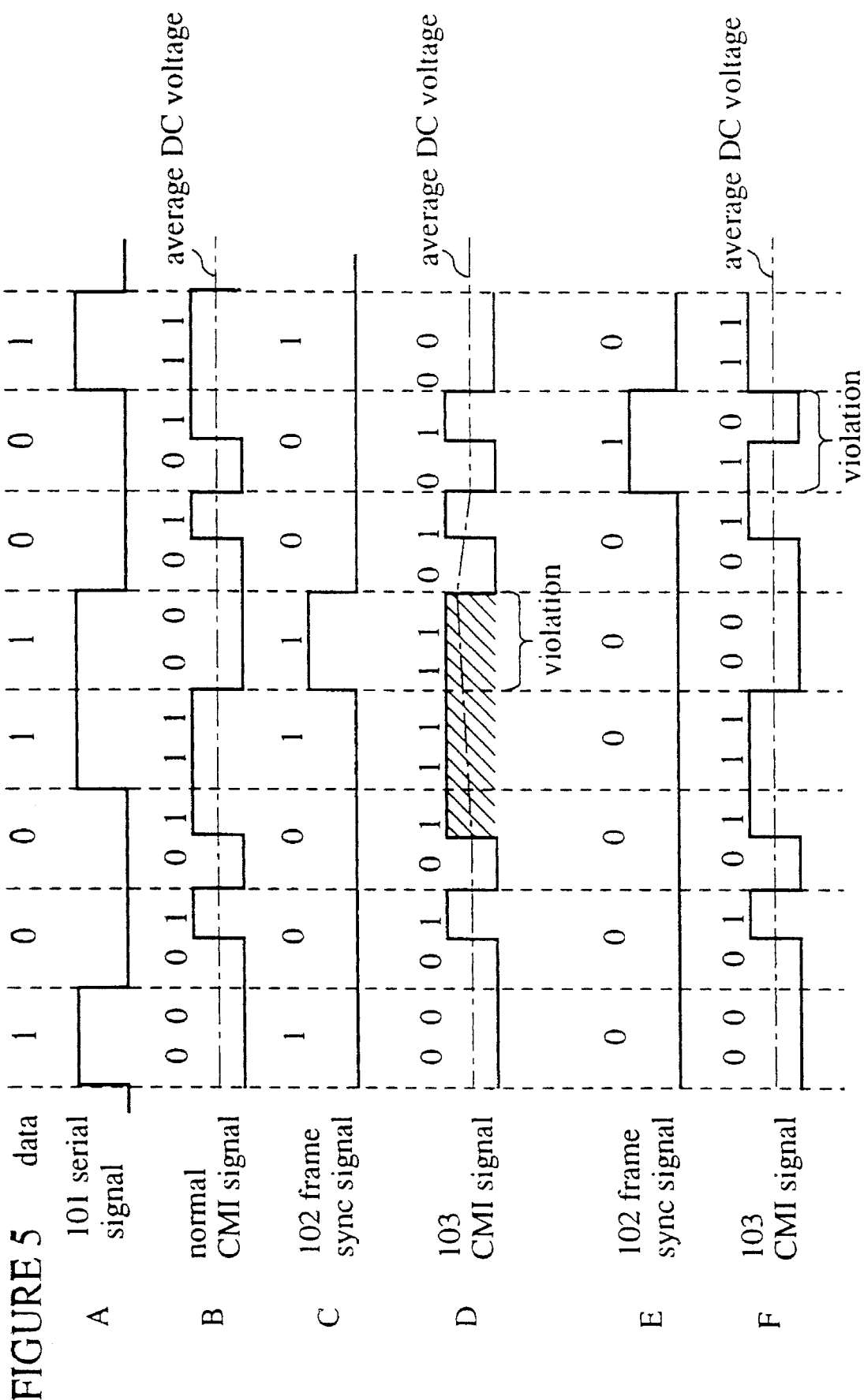
FIGS. 5A–5F show the waveforms of signals which appear when CMI codes are used in the parallel signal transmission system shown in FIG. 3.
Figure 6:
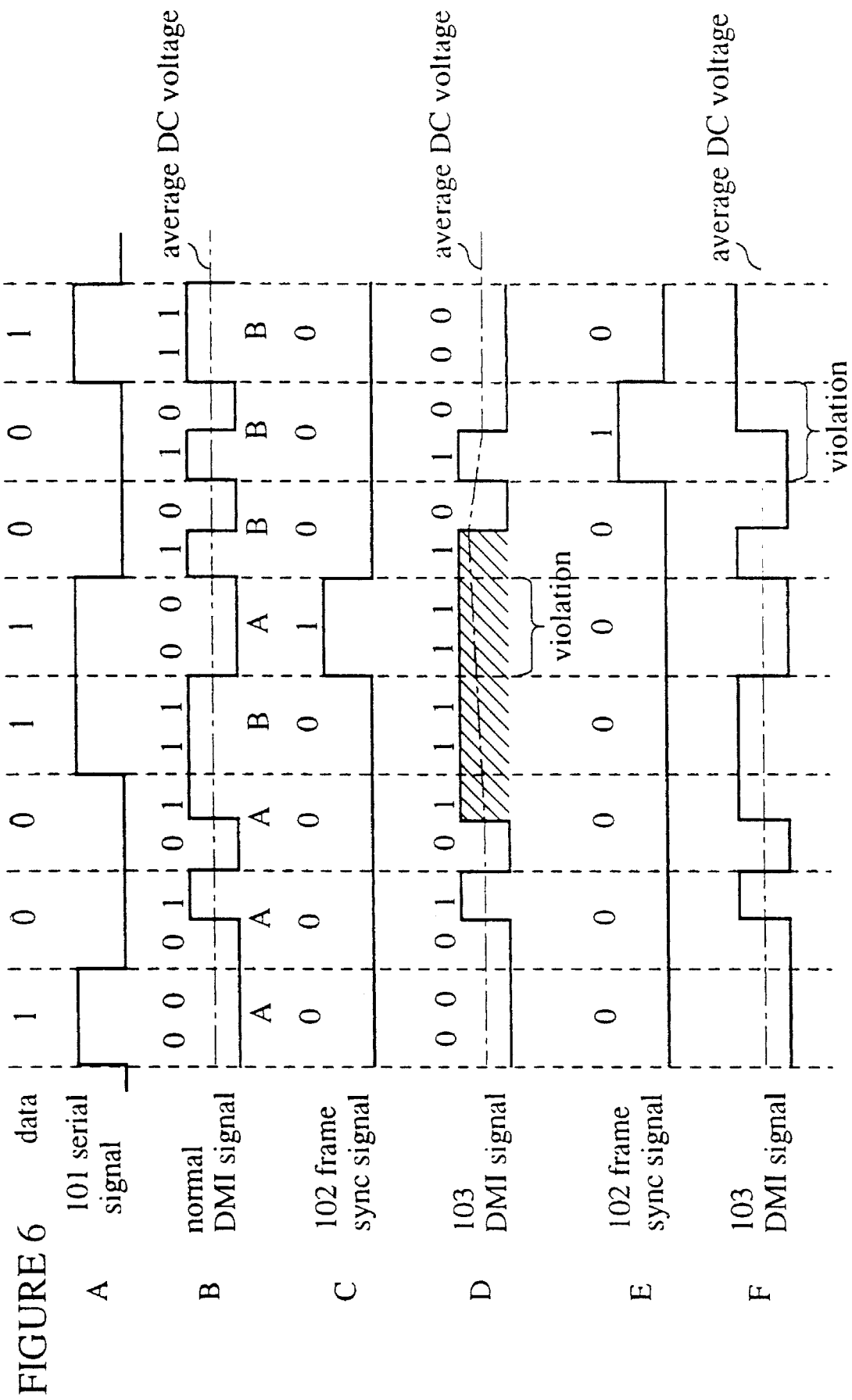
FIGS. 6A–6F show the waveforms of signals which appear when DMI codes are used in the parallel signal transmission system shown in FIG. 3.

The encoding process is accompanied with a multiplex operation of a 1-bit frame sync signal 102 by using a coding rule violation (hereinafter CRV) of the DC equilibrium signals 103, which is the frame sync bit as a conversion clock to be used in the parallel/serial conversion circuit 30. The coding process will be detailed in FIGS. 5 through 6.

Then, the drive circuit 12 directly drives the LD 13 having a 0.78 μm wavelength in accordance with the DC equilibrium signals 103 multiplexed with the frame sync signal, thereby outputting intensity-modulated optical signals to the transmission path B. The intensity modulation is in proportion to the amount of the current to be applied on the LD 13, in the same manner as the conventional systemic.

LDs having a 0.78 μm wavelength to be used as light emitting elements are mass-produced for CDs and available at a low cost. Needless to say, they realize the stable emission of lights with sufficient coherency.

Since the LD 13 is driven in accordance with the DC equilibrium signals 103 freed from the succession of a same sign, the duration of its light emission becomes shorter than that of the conventional 8B/10B codes, according to the coding rule. As a result, the LD 13 suffers from fewer mode hopping noises.

Furthermore, the size of the circuit in the transmission unit A can be reduced because the conventional 8B/10B circuit and frame sync signal generation circuit are unnecessary. This can reduce power consumption.

The light transmission path B is composed of a plastic clad fiber (hereinafter PCF) 32 having a core diameter of 200 μm. Commercially available PCFs have a core diameter of either 200 μm or 230 μm. The former is more popular and used in the present invention for the cost reduction of the system.

As described earlier, the LD 13 emits a light in an approximate range of ±10 degrees in the horizontal direction and ±20 degrees in the vertical direction. In contrast, the PCF 32 receives a light within an angle of ±23.5 degrees, so that the PCF 32 can take in a light sent from the LD 13 without an expensive lens disposed therebetween.

Thus, requiring no specific technique to be connected with an LD, PCFs have been extremely useful and used for the transmission of control signals with 50 Mbps or so. However, it has been considered that PCFs cannot be used for a high speed signal transmission because the transmission band width must be small due to the large core diameter of PCFs. As mentioned earlier, the Fiber Channel system standardized by ANSI uses GI, not PCF.

The PCF 32 has the following features.

The range of the wavelengths, or the lowest transmission loss band of the PCF 32 lies in between 0.7 and 0.8 μm, which agrees to the light wavelength band of the LD 13. This indicates the possibility of minimizing the transmission loss and extending the transmission distance.

Furthermore, having a much larger core diameter than GI, PCFs can lessen the probability of the occurrence of modal noises to be caused by the divergence of the light axis at the connecting portion of a connector or a splice to be provided on a transmission path. For example, a 5 µm divergence of the light axis for a core diameter of 50 µm would affect about 10% of the core diameter. In contrast, in the case of the PCF 32 having a core diameter of 200 µm, the effect would be about 2.5%. Thus, PCFs are very useful because precision adjustment of the light axis is unnecessary.

Thus, PCFs, which are difficult to use for a high speed signal transmission, can be used within about 200 to 500 Mbps, making the best use of their advantages.

In the reception unit C, optical signals sent through the PCF 32 are received with the light reception element 33 which is composed of a photo-sensitive silicon photo diode having a 0.78 µm wavelength, and photo/electric converted. The diameter of the light reception element 33 is made larger than 200 µm of the core diameter of the PCF 32 to be used as the light transmission path B. To be more specific, when the wavelength of received optical signals is 0.78 µm, the angle of a light going out from the PCF 32 having a core of 200 µm is about 0.3 degrees. Consequently, when the distance between the end of the waveguide of PCF 32 and the light reception element 33 is 1 mm, the diameter of the light reception element 33 becomes about 210 µm.

Thus, the diameter of the light reception element 33 is made larger than that of the PCF 32 to be used as the optical transmission path, so that the entire amount of light sent through the PCF 32 is received. As a result, the probability of the occurrence of modal noises can be reduced.

Figure 4:
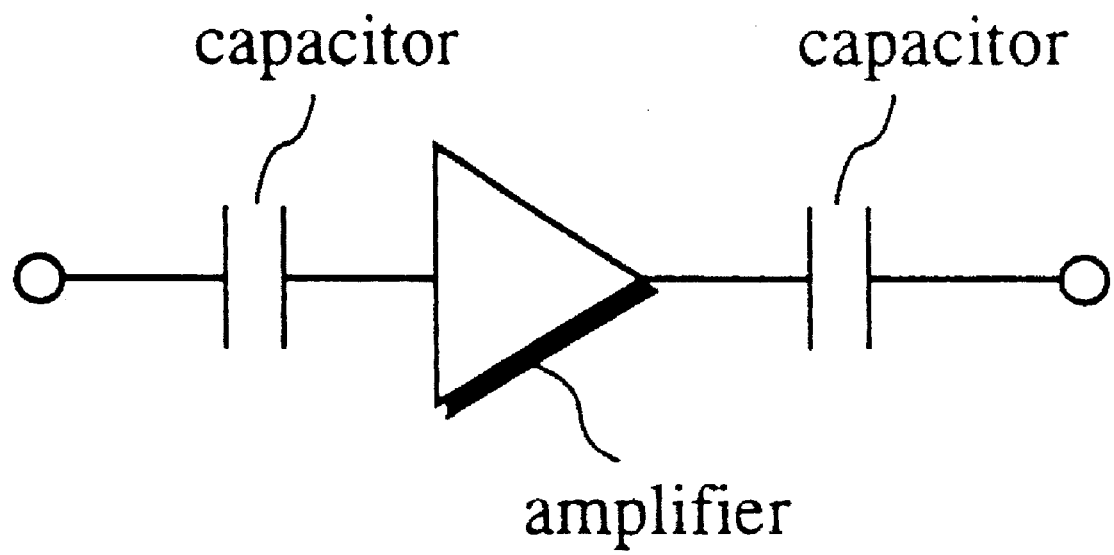
FIG. 4 is a block diagram showing the construction of a general AC coupling type amplifier.

Then, the electric signals sent from the light reception element 33 are amplified in the AC coupling type amplifier 34 to be converted into DC equilibrium signals 103 having a predetermined amplitude. In this case, the DC components hardly fluctuate because of the use of the DC equilibrium signals 103 as the transmission path signals, so that the use of the conventional DC reproduction circuit becomes unnecessary and in turn the AC coupling type amplifier 34 can be used. As shown in FIG. 4, the AC coupling type amplifier 34 is composed of circuits interconnected with capacitors, and all the circuits can be operated only with AC signals.

Consequently, the use of DC signals as bias voltage for the amplifier becomes unnecessary, and the operational bias voltage of the AC coupling type amplifier 34 is only set to the stable average DC voltage of the DC equilibrium signals. As a result, the low frequency noise has little influence.

Then, in the decoding circuit 35, the DC equilibrium signals 103 are divided into serial signals 202 and frame sync signals 203 by detecting a CRV of the DC equilibrium signals 103, and the frame sync signals 203 are used to reproduce original 8-bit parallel signals in the serial/parallel conversion circuit 36. The 8-bit parallel signals are outputted through the terminals 21–28.

The following is a description on a method for transmitting parallel signals by using, as transmission path signals, each of the CMI codes and DMI codes, which are both bi-phase codes. Since the transmission rate (clock frequency) in these codes are two times higher than that of the original binary information, the application of these codes to the transmission path having a finite band width is limited. However, in return for this limitation, the DC components and the occurrence of consecutive zero values have been successfully restricted.

FIGS. 5A–5F show the waveforms of signals which appear when the CMI codes are used in the parallel signal transmission system shown in FIG. 3. The CMI codes are direct current equilibrium signals which alternately assign "11" and "00" to "1" of inputted binary signals, and assign either "01" or "10" which has a phase hopping point in the middle of each signal transmission interval to "0".

For example, when data to be transmitted are "10011001", the 8-bit serial signals 101 show the waveform FIG. 5A. When the data are converted into CMI signals, they generally exhibit a waveform shown in FIG. 5B. Thus, "1" in the 8-bit serial signals 101 is converted into "00" or "11" alternately in the CMI signals, and "0" in the 8-bit serial signals 101 is converted into "01" in the CMI signals. As a result, the average DC voltage of the transmission path signals, which is indicated by a dashed line in FIG. 5B is fixed to ½ of the amplitude. The largest number of consecutive 1 values is 3.

When the serial signals 101 shown in FIG. 5A are multiplexed with the frame sync signals 102 shown in FIG. 5C in the timing of "1" of the fifth bit, a waveform FIG. 5D of the CMI signals 103 appears. Here, a violation of the CMI coding rule is generated. As mentioned earlier, the method of transmitting the frame sync signals 102 together with data is called CRV. Because of its excellent sync hunting property and simple circuit construction, CRV is applied to local transmission between systems at a relatively short transmission distance. The reception unit C divides received signals into data and the frame sync signals 102 by detecting CRV, and use the frame sync signals 102 to convert serial signals into parallel signals.

The average DC voltage of the transmission signals indicated by a dashed line fluctuates to some extent as a result that the frame sync signals 102 have been multiplexed; however, the change can be actually ignored by optimazing the frequency of the multiplexing.

For example, if there are 512 consecutive "1" values in the serial signals 101, then 256 bits of "L" level and 256 bits of "H" level are generated in the CMI signals. If a frame sync signal is multiplexed with 1 bit out of the 512 bits, and CRV operation is carried out at this point, then the CMI signals have 255 bits of "0" level and 257 bits of "1" level or vise versa. Consequently, the average DC voltage at this moment turns out to be (0×255+1×257)/512=0.50195. As a result, the change of the average DC voltage 0.5 caused by the CRV operation will be (0.50195−0.5)/0.5=0.4%.

Consequently, the average DC voltage is approximately fixed, so that the use of the AC coupling type amplifier 34 becomes possible, preventing the effects of low frequency noise. Although it is preferable that such change is as small as possible, this in tern leads to the enlargement in the circuit construction. As a result, the multiplexing frequency of the frame sync signals 102 is determined by taking the relation with the peripheral circuits into consideration.

When the serial signals 101 are multiplexed with the frame sync signals 102 shown in FIG. 5E in the timing of "0" of the seventh bit, a waveform shown in FIG. 5F appears. Here, the seventh bit "01" of the normal CMI signals is changed into "10", and a violation of the CMI coding rule is generated. The average DC voltage of the transmission path signals does not change, so that even if the frame sync signals 102 are multiplexed, the average DC voltage of the CMI signals is always ½ of the signal amplitude.

As explained hereinbefore, when the CMI signals 103 are multiplexed with the frame sync signals 102, a violation having a condition shown in either FIG. 5D or 5E is generated. The duration of light emission of the LD 13 becomes longest when the serial signals 101 are multiplexed with the frame sync signals 102 in the timing of "1" as shown in FIG. 5D where "1" is consecutive in 5 bits as indicated by slanting lines.

To be more specific, when the bit rate is 192 Mbps, the signal transmission rate on the transmission path is 192×(2/1)=384 Mbps, and the duration of light emission of the LD 13 when "0" is contiguous in 5 bits is (1/384M)m×5=13 ns. Thus, the longest duration of light emission of the LD 13 is reduced to about 52%, as compared with the conventional 8B/10B system where the duration of light emission with 192 Mbps bit rate is 25ns. Consequently, the probability of the generation of mode hopping noises can be restricted to a low degree.

In the case of the waveforms shown in FIG. 5B and 5F, the duration of light emission becomes longest when consecutive "1" for 3 bits is given. This duration is apparently shorter than the case where consecutive "1" for 5 bits is given. Consequently, the generation of the mode hopping noises can be restricted to a much lower degree.

FIGS. 6A–6F show the waveforms of signals which appear when DMI codes are used in the parallel signal transmission system shown in FIG. 3. The DMI codes are DC equilibrium signals similar to the CMI codes, and assigns two modes to inputted binary signals "1" and "0", and every time a value "1" appears, the mode is reversed. To be more specific, A mode "11" and B mode "00" are assigned to "1", and A mode "01" and B mode "10" are assigned to "0", and every time a value "1" appears, the mode is changed.

FIG. 6A shows the waveform of the serial signals 101 and FIGS. 6C and 6E show the waveforms of the frame sync signals 102, which are equal to FIGS. 5A, 5C, and 5E respectively.

FIG. 6B shows the waveform of the normal DMI signals, and the average DC voltage indicated by dashed lines is always ½ of the signal amplitude and the largest number of consecutive 0 is two.

FIG. 6D shows a waveform of the DMI signals 103 obtained by multiplexing the DMI signals shown in FIG. 6B with the frame sync signals 102 shown in FIG. 6C. As shown in these waveforms, "1" is consecutive for 6 bits in the neighborhood where a violation is generated. The average DC voltage slightly increases, which can be ignored by optimizing the frequency of multiplexing the frame sync signals 102.

FIG. 6F shows a waveform of the DMI signals 103 obtained by multiplexing the DMI signals shown in FIG. 6B with the frame sync signals 102 shown in FIG. 6E. The average DC voltage in this case always becomes ½ of the signal amplitude in the same manner as FIG. 5F.

As explained hereinbefore, the use of the DMI codes as a transmission path signals does not affect the probability of the generation of mode hopping noises. In addition, no change of the average DC voltage allows the use of the AC coupling type amplifier 34, which prevent the effects of the low frequency noise. Furthermore, the frame sync signals can be separated from received signals by detecting a violation in the reception unit C.

Figure 7:
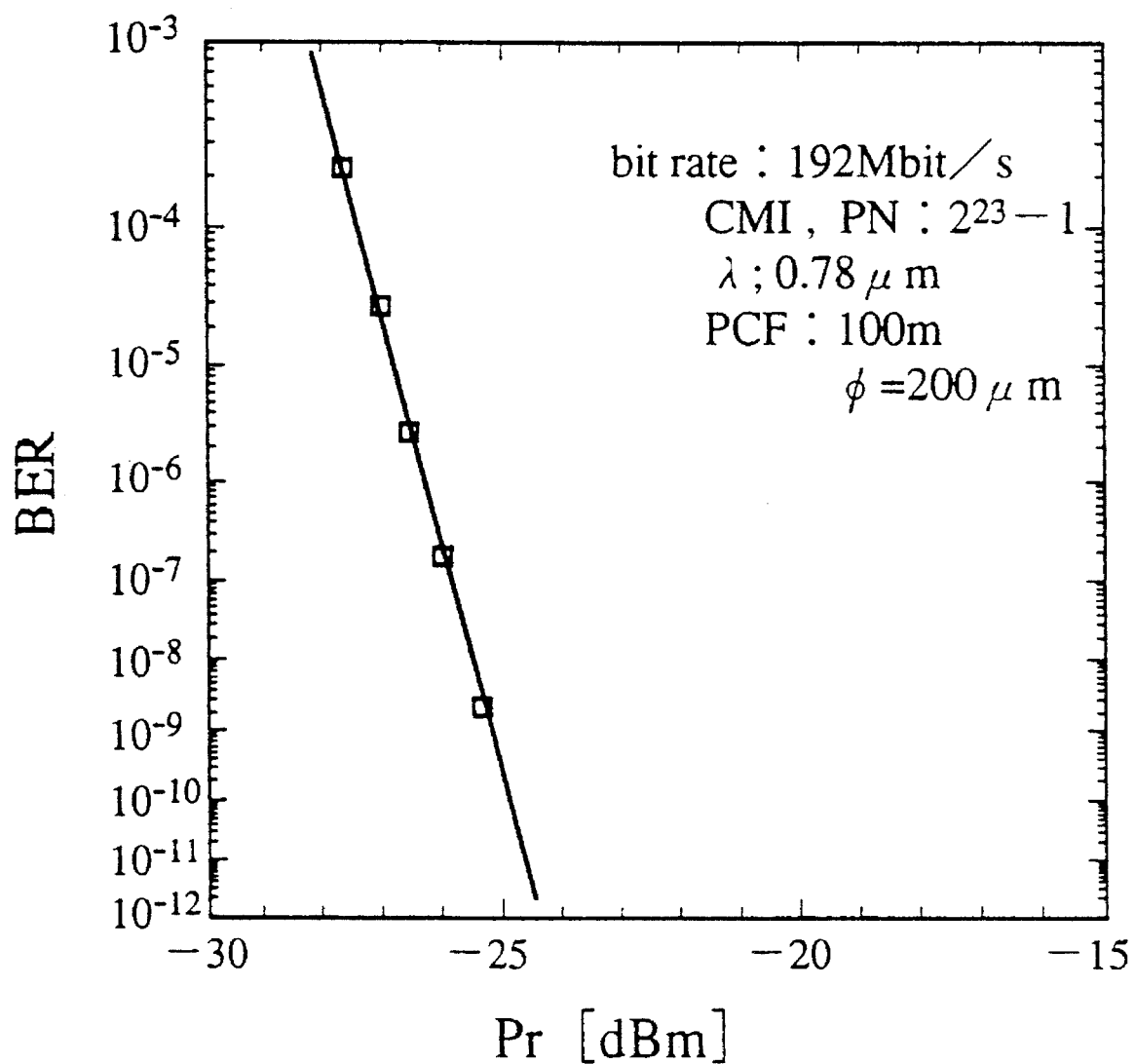
FIG. 7 is a graph showing BER measured in an optical transmission experiment performed with the parallel signal transmission system shown in FIG. 3.

FIG. 7 is a graph showing a bit error ratio (hereinafter BER) measured in an optical transmission experiment performed with the parallel signal transmission system shown in FIG. 3.

The horizontal axis indicates received power (hereinafter Pr) of the light receptor in the unit of [dBm] (1 mW=0 dBm), and the vertical axis indicates BER.

According to the experiment, the bit rate of transmitted data was made 192 Mbps and the CMI codes was used as the transmission path signals. The transmission data were pseudo-random pattern to be repeated in the unit of $2^{23}-1$ bit. Then, the data was converted into optical signals by using an LD having a 0.78 μm wavelength. The optical signals were transmitted as far as 100 m through the PCF having a core of 200 μm in diameter, and the BER at thins point was measured.

As apparent from the graph, when Pr of a received light was −25 dBm, BER was $1×10^{-9}$ or smaller, obtaining a BER which was small enough for practical use.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A parallel signal transmission system for transmitting parallel signals composed of a plurality of bits from a transmission unit to a reception unit via an optical transmission path, wherein said transmission unit comprises:
  a parallel/serial signal conversion means for converting received parallel signals into serial signals frame by frame, said frame being composed of the plurality of bits, in accordance with a 1-bit frame sync signal, and outputting the serial signals;
  an encoding means for converting the serial signals outputted from said parallel/serial signal conversion means into direct current equilibrium signals to be used as transmission path signals in conformance with a characteristic of said optical transmission path, and for, at a same time, multiplexing a predetermined bit of the direct current equilibrium signals with the 1-bit frame sync signal by using code rule violation; and
  an electric/photo signal conversion unit for driving a laser diode having a laser beam of 0.78 μm wavelength in accordance with the direct current equilibrium signals multiplexed with the 1-bit frame sync signal and outputting optical signals intensity-modulated by the laser diode;
said optical transmission path is composed of a plastic clad fiber and directly connected with the laser diode without a lens therebetween;
said reception unit comprises:
  a photo/electric conversion means for receiving optical signals sent through said optical transmission path by means of a light reception element made of a silicone photo diode, converting the received optical signals into electric signals, amplifying the electric signals into direct current equilibrium signals having a predetermined amplitude with an alternating current coupling type amplifier, and outputting the direct current equilibrium signals;
  a decoding means for receiving and decoding the direct current equilibrium signals into serial signals and for outputting the serial signals separately from the 1-bit frame sync signal by detecting a coding rule violation; and
  a serial/parallel signal conversion means for receiving the serial signals and the 1-bit frame sync signal separately, converting the serial signals into original parallel signals frame by frame in accordance with the 1-bit frame sync signal, and outputting the original parallel signals.

2. The optical transmission system of claim 1, wherein the direct current equilibrium signals to be used as the transmission path signals are one of coded mark invention codes and differential mode invention codes which are both 1B/2B signals.

3. The optical transmission system of claim 2, wherein
   the 1-bit frame sync signal is multiplexed with the converted direct current equilibrium signals in a predetermined timing of the serial signals outputted from said parallel/serial signal conversion means, and
   a longest duration of light emission of the laser diode is dependent on a signal transmission rate on said optical transmission path and a number of consecutive positive-signed signals to be formed by the multiplexing with the 1-bit frame sync signal.

4. The optical transmission system of claim 3, wherein an average direct current voltage of the direct current equilibrium signals is one of being fixed to ½ of the signal amplitude and slightly fluctuating when a violation is generated by the multiplexing with the 1-bit frame sync signal, said fluctuation being restricted to an ignorable degree by optimizing a frequency of multiplexing of the 1-bit frame sync signal.

5. The optical transmission system of claim 1, wherein the plastic clad fiber has a core whose diameter is large enough to receive an entire laser beam emitted from the laser diode.

6. The optical transmission system of claim 5, wherein
   the diameter of the core of the plastic clad fiber is 200 µm or larger in order to agree with the laser diode having a 0.78 µm wavelength, and
   the plastic clad fiber has a wavelength which has a lowest transmission loss in a light emitting band width of the laser diode.

7. The optical transmission system of claim 6, wherein the silicon photo diode has a core whose diameter is large enough to receive an entire laser beam emitted from the plastic clad fiber.

8. The optical transmission system of claim 7, wherein the alternating current coupling type amplifier uses the direct current voltage of received signals as an operational bias voltage.

9. A parallel signal transmission method for transmitting parallel signals composed of a plurality of bits from a transmission unit to a reception unit via an optical transmission path, said method comprising the steps of:
   converting parallel signals into serial signals frame by frame each composed of the plurality of bits, by using a 1-bit frame sync signal;
   converting obtained serial signals into direct current equilibrium signals;
   multiplexing a predetermined bit of direct current equilibrium signals with the 1-bit frame sync signal at a predetermined frequency;
   driving a laser diode in accordance with the direct current equilibrium signals multiplexed with the 1-bit frame sync signal and converting into intensity-modulated optical signals;
   receiving the intensity-modulated optical signals outputted from said transmission unit and transmitting to said reception unit via an optical fiber having a predetermined length, said optical fiber having a plurality of coupling portions;
   receiving the intensity-modulated optical signals sent through said optical fiber and converting into electric signals;
   converting the electric signals into direct current equilibrium signals having a predetermined amplitude;
   detecting a coding rule violation in the direct current equilibrium signals;
   separating the 1-bit frame sync signal from the direct current equilibrium signals in accordance with the detected coding rule violation;
   decoding the direct current equilibrium signals separated from the 1-bit frame sync signal into serial signals; and
   converting the serial signals into parallels signals frame by frame in accordance with the separated 1-bit frame sync signal.

10. The parallel signal transmission method of claim 9, wherein the direct current equilibrium signals in the step of converting the serial signals into direct current equilibrium signals are one of coded mark invention codes and differential mode invention codes, which are both 1B/2B codes.

* * * * *